(12) United States Patent
Le Saux et al.

(10) Patent No.: US 6,789,898 B2
(45) Date of Patent: Sep. 14, 2004

(54) MODEL FOR REPRESENTING AN OPHTHALMIC LENS SURFACE

(75) Inventors: Gilles Le Saux, Paris (FR); Pascal Allione, Courbevoie (FR)

(73) Assignee: Essilor International, Charenton Cedex (FR)

( * ) Notice: Subject to any disclaimer, the term of this patent is extended or adjusted under 35 U.S.C. 154(b) by 0 days.

(21) Appl. No.: 10/459,157

(22) Filed: Jun. 11, 2003

(65) Prior Publication Data

US 2003/0231282 A1 Dec. 18, 2003

(30) Foreign Application Priority Data

Jun. 17, 2002 (EP) .............................................. 02291502

(51) Int. Cl.[7] .................................................. G02C 7/02
(52) U.S. Cl. ........................................ 351/159; 351/177
(58) Field of Search .............................. 351/159, 160 R, 351/160 H, 161, 164, 168–71, 175, 177

(56) References Cited

U.S. PATENT DOCUMENTS

| | | | |
|---|---|---|---|
| 5,137,343 A | 8/1992 | Kelch et al. ................ | 351/169 |
| 5,488,442 A | 1/1996 | Harsigny et al. ........... | 351/169 |
| 5,636,338 A | 6/1997 | Moreton ...................... | 395/142 |
| 5,708,492 A * | 1/1998 | Kitani ......................... | 351/169 |
| 5,861,935 A | 1/1999 | Morris et al. ............... | 351/169 |
| 6,213,603 B1 | 4/2001 | Altheimer et al. .......... | 351/169 |
| 6,220,705 B1 * | 4/2001 | Francois et al. ............ | 351/169 |
| 6,318,859 B1 | 11/2001 | Baudart et al. ............. | 351/169 |
| 6,382,789 B1 | 5/2002 | Baudart et al. ............. | 351/177 |
| 6,595,638 B2 * | 7/2003 | Ahsbahs et al. ............ | 351/169 |

* cited by examiner

*Primary Examiner*—Jordan M. Schwartz
*Assistant Examiner*—Jessica Stultz
(74) *Attorney, Agent, or Firm*—Fish & Richardson P.C.

(57) ABSTRACT

An ophthalmic lens having a complex surface and a toric or spherical surface is represented in a model using a prism reference point and a prescription point on the complex surface, the normal to the complex surface at the prism reference point, the local characteristics of the complex surface at the prescription point or around the prescription point, lens thickness measured along the axis defined by the normal to the complex surface, the plane tangential to the toric or spherical surface on the axis, and the curvatures of the toric or spherical surface. Representation of the lens in this model allows calculation of the toric or spherical surface without knowing all the characteristics of the complex surface. Calculations are simpler for the fitting of the lens into frames adapted to the wearer.

13 Claims, 5 Drawing Sheets

Figure 1

SECTION AA'

MODEL FOR REPRESENTING AN OPHTHALMIC LENS SURFACE

CROSS REFERENCE TO RELATED APPLICATIONS

Pursuant to U.S.C. §119, this application claims the benefit of European Patent Application 02291502.9, filed Jun. 17, 2002.

FIELD OF THE INVENTION

The present invention relates to ophthalmic lenses and, more particularly, to a model for representing a complex surface of a lens, for example a progressive multifocal surface. It applies notably to the calculation of a prescription surface that is spherical or toric, of an ophthalmic lens.

BACKGROUND OF THE INVENTION

Multifocal ophthalmic lenses are well known; from among multifocal lenses we can distinguish those known as progressive lenses, and lenses more specifically tailored to close vision. Progressive multifocal ophthalmic lenses are used for correcting presbyopic vision and allow the spectacle wearer to view objects over a wide range of distances, without removing his or her spectacles. Such lenses typically include a far vision region, located at the top of the lens, a close vision region in the lower part of the lens, an intermediate region connecting the near and far vision regions, with a main meridian of progression passing through these three regions. A reference point is provided for far vision in the far vision region, and a reference point for near vision is provided in the near vision region. Such lenses are for example described in French patent application FR-A-2,699,294, U.S. Pat. Nos. 5,270,745, 5,272,495, and French patent applications FR-A-2,683,642, FR-A-2,699,294 or FR-A-2,704,327.

Lenses that are more specifically dedicated to close vision also exist; such lenses do not have a far vision region with a defined reference point as do conventional progressive lenses. Such lenses are prescribed as a function of the power the wearer requires for close vision, independently of far vision power. This type of lens is described in an article in the April 1988 issue of the "Opticien Lunetier" and is marketed by the assignee under the name Essilor Interview. This lens is also described in French patent application FR-A-2,588,973.

Habitually, multifocal lenses, whether they be progressive or dedicated to close vision, include a non-spherical multifocal face, for example the face opposite the spectacle wearer, and a spherical or toric face, known as the prescription face. This spherical or toric face allows the lens to be adapted to the user's ametropia as prescribed by an ophthalmic surgeon. A multifocal lens is thus generally a semi-finished product which needs to be adapted to the wearer by machining the prescription face. Such a multifocal lens can be defined by supplying hundreds of parameters defining the altitude of a large number of points on the surface. An adaptation process for a spherical or toric face is described in detail in European patent application EP-A-0 990 939; it is proposed to use, for defining the rear face, a ray tracing program and to proceed by optimization. In this case, the front face is modeled using Zernike polynomials. European patent application EP-A-0 990 939 also mentions that a non-spherical surface is generally defined by the altitudes of all the points on the surface, or yet again by values for mean sphere and cylinder at all points of the surface. Sphere and cylinder at a point being conventionally defined as the half sum and difference of the maximum and minimum curvatures of the surface at this point multiplied by a factor of (n−1), where n is the refractive index of the lens material.

U.S. Pat. No. 5,444,503 proposes defining the lens prescriptions surface from aberrations over a whole lens surface, by appropriately varying a parameterized continuous surface, for example a surface defined by splines, using known mathematical optimization algorithms.

U.S. Pat. No. 6,089,713 corresponding to European patent application EP-A-0 857 993 discloses a lens having a spherical or non-spherical front face, with symmetry in rotation. The rear face is adapted to the wearer, to provide the lens with the sphere, astigmatism and prism prescribed, and their distribution over the lens. The multifocal surface is defined for each user.

U.S. Pat. No. 2,878,721 discloses a multifocal lens with a prescription face on the front of the lens. The prescription face is used for adapting the lens to the user, without the nature of this adaptation being however stated explicitly.

For single-focus lenses, power is conventionally calculated using the Gullstrand formula, at the optical center of the lens. It is consequently sufficient to know the refractive index n of the material, the radii of curvature of each face of the lens and their orientation, and thickness e at the optical center, to determine lens power. For example, if the front and rear face of the lens are locally spherical at the optical center, and C1 is the curvature of the front face and C2 that of the rear face at the optical center, Gullstrand's formula is written, as the person skilled in the art knows, as:

$$P=(n-1)(C1/(1-e(n-1)C1/n)-C2)$$

This approximation is in fact only valid when the point considered for the calculation has, locally, the shape of a sphere or torus—as is the case for a single focus lense, the local prism of the lens at the point considered is small and the radius for which lens power is calculated has zero angle of incidence with the latter.

Below we shall call "complex lens for the point considered" or more simply "complex lens", any ophthalmic lens for which the power at this point cannot be calculated by simple application of Gullstrand's formula; complex lenses consequently comprise notably:

progressive multifocal lenses;

non-spherical single focus lenses, spherical lenses having prism, or more generally, any lens considered outside its optical center. Below, we mean by the term "complex surface" of a "complex lens" any surface which is, overall, neither spherical nor toric.

Whatever the process used for providing the prescription face of a complex lens, the characteristics of the complex surface of the lens are required, it is consequently necessary to know the characteristics of a complex lens and to manipulate these characteristics for example, for supplying them to a processing machine.

One aim of the invention, in certain embodiments, is to model the complex surface of a lens, accurately and simply at one point or around one point, in order to be able to calculate power at this point, in different configurations, without it being necessary to know in an exhaustive fashion, the geometry of a complex surface of the lens.

The invention consequently provides a model for representing a complex surface of an ophthalmic lens, the model comprising:

a prism reference point and a prescription point;

the normal (or normal vector) to the complex surface at the prism reference point, and the local characteristics of the complex surface at the prescription point or around the prescription point.

In one embodiment, the local characteristics around the prescription point comprise local characteristics within a circular patch or disc centered on the prescription point and of diameter greater than or equal to 2 mm.

It can also be arranged for the local characteristics around the prescription point to comprise local characteristics within a circular patch or disc centered on the prescription point and of diameter less than or equal to 12 mm. Alternatively, the local characteristics around the prescription point can comprise local characteristics within a circular patch or disc centered on the prescription point and not covering the prism reference point.

In all cases, the local characteristics at the prescription point can comprise the normal and the main curvatures with their orientations at this prescription point within a given reference frame.

The invention also provides model for representing a lens having a first surface and a second spherical or toric surface, the model comprising a model of the first surface of the lens as set out above;

optical component thickness measured along an axis defined by the normal to the complex surface at the prism reference point;

the plane tangential to the second surface of the lens on the axis;

the main curvatures and their orientations for the second surface.

The invention further provides, in another embodiment, a method for calculating the prescription surface of a semi-finished lens having a surface is also provided, comprising:

providing a prescription comprising at least a power and a prism;

providing a representation of a surface in the model as set out above;

calculating a spherical or toric prescription surface using ray tracing passing through a prescription point or around the prescription point.

In this case, the calculation step can comprise:

choosing a lens thickness;

providing a starting prescription surface having, on an axis defined by the normal to the complex surface at the prism reference point, a prescribed prism;

varying curvatures and their orientation for the starting prescription surface, with constant prism, so that powers calculated by ray tracing approach prescribed powers.

Further characteristics and advantages of the invention will become more clear from the detailed description below of some embodiments thereof provided solely by way of example, and with reference to the attached drawings.

DETAILED DESCRIPTION OF PREFERRED EMBODIMENTS

The invention provides a model for representing a complex surface or a lens having a complex surface, which is of a nature to allow the operations habitually practised in a prescription laboratory—notably the calculation of a prescription surface—to be performed. The model of the invention avoids having to know all the characteristics of the complex surface of the lens. On the contrary, providing a limited number of values for the parameters of the model is sufficient. In the simplest embodiment of the invention, the model comprises the following parameters a prism reference point and a prescription point on the surface of the lens;

a normal vector to the complex surface at the prism reference point, and local characteristics of the complex surface at the prescription point, e.g. normal and main curvatures with their orientations.

This makes it possible to represent a complex surface in the model, using values, that is six values for the coordinates of the prism reference point and prescription point;

three values for the normal vector, and three values for the curvatures and their orientation—bearing in mind that the main and normal curvatures are perpendicular one to the other.

Overall, the model makes it possible to represent the lens using 12 values, instead of the higher number of values generally used in the prior art.

Figure 1:
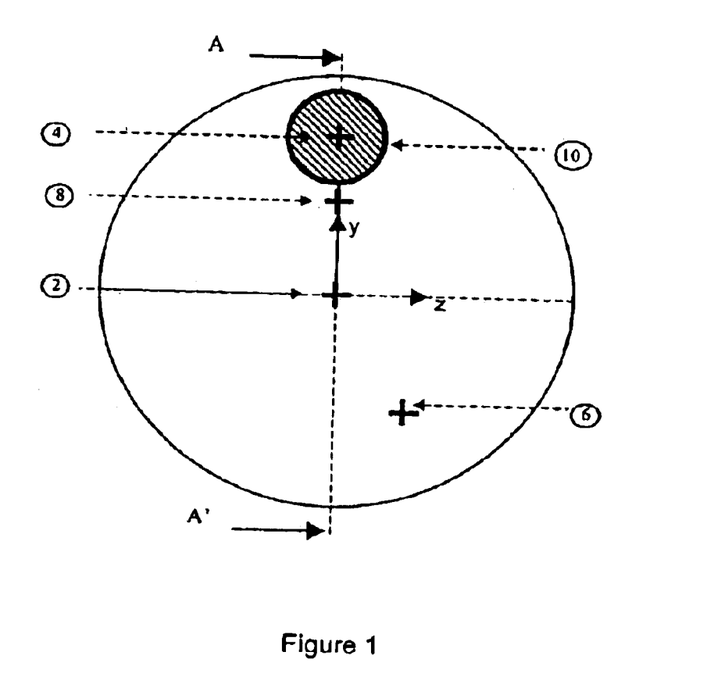
FIG. 1 shows a diagrammatic view of a lens surface.

FIG. 1 shows a view of the complex surface of a lens. We have shown a semi-finished lens of circular shape, typically of 60 mm diameter. One point on the lens is used by the prescription laboratory as a reference for prism; this is generally the center of the lens, identified by reference numeral 2 in FIG. 1. The prism reference point is habitually materialized by a visible mark on the lens. The prism reference point is used by the prescription laboratory for adapting the lens to the prism described for the particular wearer by the eye specialist.

The lens also has a point used for calculating, or measuring, characteristics prescribed for the wearer; these can be power, in the absence of astigmatism being prescribed for the spectacle wearer. This can also be power, cylinder and an axis if the wearer suffers from astigmatism needing correction. Such a prescription amounts to supplying two powers and an axis. Below, we shall use the term "prescription point" for designating this point on the lens.

In the case of a progressive lens, it is generally the far vision reference point that is used as the prescription point. We then consider the eye specialist's prescription for far vision. For a progressive lens, the near vision reference point 6 can also be used as the prescription point: in this case, the prescription is that furnished by the eye specialist for close vision. For a lens dedicated to close vision, the near vision reference point is used as the prescription point. In FIG. 1, we have shown the case for a progressive multifocal lens, with the point 4 as the far vision reference point; in lenses sold by the assignee, this point is 8 mm above the center of the lens.

Below we shall use the term "characteristic point" of the lens for the prism reference point (or PRP) and the prescription point—whether this be the far vision reference point or the near vision reference point, or, yet again, some other point on the lens.

The lens also, conventionally, has a fitting cross 8. This is a point which is materialized on the lens surface and is used by the optician for mounting the lens in the frame. In the assignee's lenses, this point is located 4 mm above the PRP. This point is not a "characteristic point" in the sense of this present specification, but is useful for positioning the lens in front of the wearer's eye.

The invention proposes supplying, for representing a complex surface of a lens, a model having the following elements:

the prism reference point and the prescription point;
the normal to the complex surface at the prism reference point, and
the local characteristics of the complex surface at the prescription point.

These various elements can be supplied in various forms: it is sufficient to be able to position the complex surface, i.e.

to be able to place, at a given point, the prism reference point, with the normal in a given direction, and
to then know the position of the prescription point, and
the local characteristics of the complex surface at the prescription point or around it.

It thus possible, as explained below, to calculate a prescription surface or to calculate lens power at the prescription point, in various configurations.

The elements forming the model can be expressed in an ortho-normed reference frame the origin of which is the prism reference point, the x axis of which has the same direction as a normal to the complex surface at this point and the z axis of which is given by the tangent to the complex surface at the prism reference point contained in a horizontal plane in a position of use of the lens, the y axis then being the axis that is orthogonal to the other two. FIG. 1 shows, in this case, the x and y axes. A reference frame could also be defined by indicating that the y and z axes are tangential to the complex surface at the prism reference point and correspond to the orientation of the lens during its use. Thus, in the progressive lenses of the assignee, the vertical is defined by the center of a lens (which is also the prism reference point) and by the fitting cross which are both materialized on the lens. One could, in this case, define a reference frame by simply indicating that the (y, z) plane is tangential to the lens at the prism reference point and that the (x, y) plane contains the fitting cross.

In all cases, supplying the prism reference point, the prescription point and the normal to the complex surface at the prism reference point allows the complex surface of the lens to be positioned, and a ray to be directed towards the prescription point.

The local characteristics of the surface are supplied at the prescription point, or around the latter. For supplying these characteristics, the above reference frame, centered on the prism reference point or a reference frame centered on the prescription point can be employed. If a second reference frame, centered on the prescription point is used, one can ensure that the plane that is tangential to the prescription point is the (y, z) plane of this second reference frame; it is nevertheless necessary to know the directions of the axes of the second reference frame in the first, so as to be able to freely proceed with a change of reference frame.

If the local characteristics of the surface at the prescription point are supplied, these can consist of the first and second derivatives of the surface at the prescription point—which represents five coefficients.

The local characteristics around the prescription point can be supplied inside a circular patch or disc 10 the center of which is the prescription point and which extends over the complex surface around the prescription point; the diameter of the circular patch is greater than or equal to 2 mm so as to supply the characteristics of the surface at least in the immediate vicinity of the prescription point. The diameter of the circular patch is less than or equal to 12 mm—this size being sufficient for modeling this complex surface and limiting the amount of information needed for surface modeling. As an alternative to this 12 mm diameter, the size of the circular patch can be limited so as not to cover two characteristic points on the lens: in this case, the circular patch extends around the prescription point—the point VL or VP—and does not include the prism reference point.

Inside this circular patch, the local characteristics of the complex surface can be supplied in one or the other of the reference frames mentioned above, in various forms. One can thus provide an altitude map of various points on the complex surface; one can also provide a representation of the complex surface by polynomial decomposition, for example using families of polynomials provided in commercially-available surface calculation software. For example, in the case of Zernike polynomials (or other polynomials), a third order decomposition for a 2 mm diameter patch or up to a fifth order decomposition for a 10 mm or higher diameter patch can be employed. The choice of third order as the minimum results from the fact that a second order decomposition provides no additional information over a simple representation of a surface at the prescription point by single data for its first and second derivatives. Modeling accuracy increases with polynomial order; tests carried out by the assignee showed that a polynomial order greater than five does not lead to significant improvement in the accuracy with which a prescription surface can be calculated, for the range of diameters considered.

Tests carried out by the assignee envisage using Zernike polynomials up to the fifth degree for a circular patch diameter ranging from 8 mm to 12 mm, the fourth degree for a diameter from 3 mm to 7 mm and third degree polynomials for a diameter strictly below 3 mm.

The complex surface mode described above can also serve for "local" representation of the lens. In this case, the model is employed for the complex surface of the lens. If the other surface of the lens is a toric or spherical surface, it is sufficient to supply, along with the representation of the complex surface in the model, the following information for a complete model of the lens:

lens thickness at the PRP;
the tangential plane of the other surface of the lens,
the principal curvature or curvatures of the other surface of the lens and their orientations, and
the refractive index of the material making up the lens.

Lens thickness is measured along a given axis at a given point; generally this is a prism reference point, and the normal to the front surface at this point.

The tangential plane of the other surface of a lens is given, for example at the intersection of the lens with the axis along which thickness is measured. The tangential plane can be given by simply supplying the unit vector normal to the other surface of a lens, at the point of intersection with the axis.

The curvature or curvatures of the other surface of a lens and the orientation(s) thereof can be given directly or indirectly by the data for a prescription, in a given configuration. In this latter case, the curvatures and their orientations are calculated so as to satisfy the given prescription.

Figure 2:
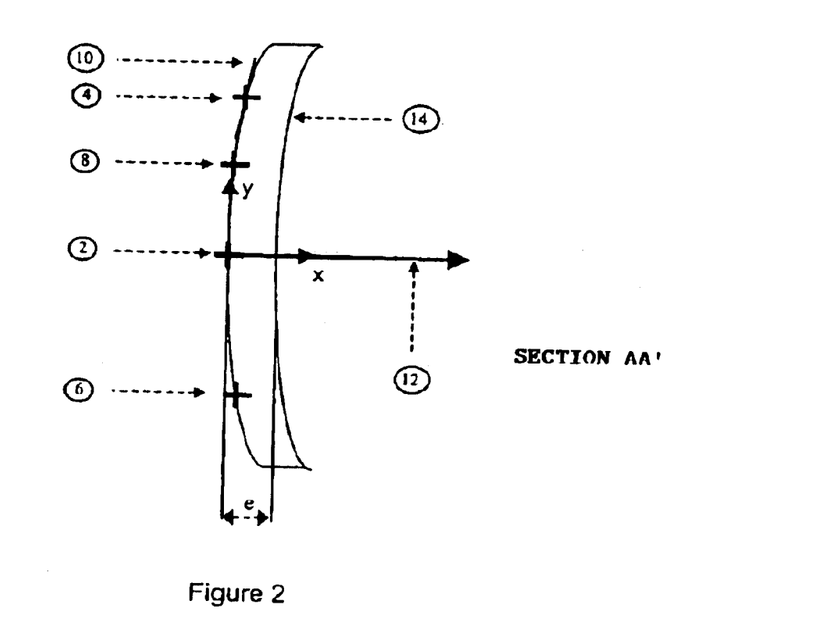
FIG. 2 is a diagrammatic view in section of a lens, along line AA of FIG. 1.

FIG. 2 is a view in section of a complex lens, in a vertical plane. The prism reference point is indicated along with the prescription point and the circular patch for the complex surface, carrying the same references as in FIG. 1. The complex surface has a normal at the prism reference point which coincides with the x axis of the lens. Thickness e is measured along the x axis; additionally, the normal vector 12 defining the plane tangential to the prescription surface on the x axis is shown.

The lens model thus proposed is notably able to be used for calculating prescription, as indicated below.

We shall describe, with reference to FIGS. 3–7, the steps in a method for calculating the prescription surface of a complex lens such that the power prescribed is obtained under spectacle lens wearing conditions. The starting point is a semi-finished lens having a complex surface, modeled as indicated above.

Figure 3:
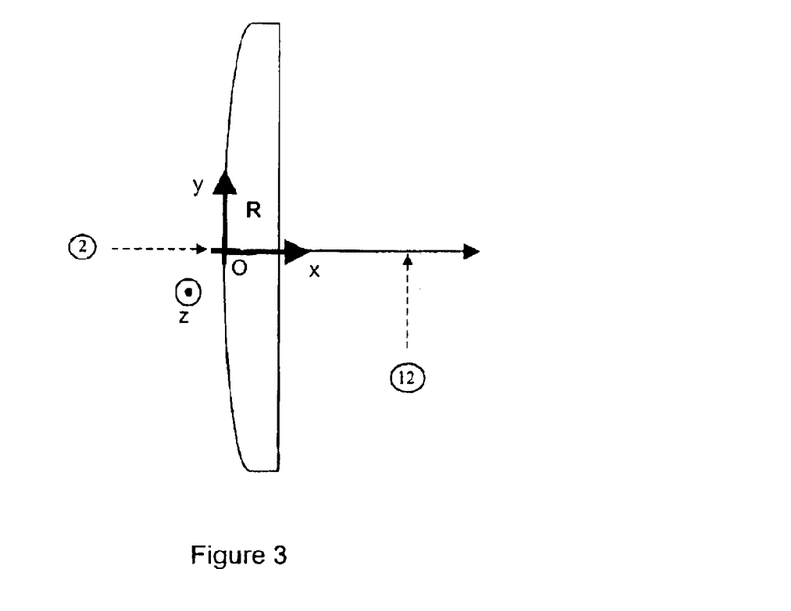
FIGS. 3–7 show various steps in a process for calculating the prescription surface, in a wearer configuration, for a lens using the model according to the invention.

The first step consists in associating a reference frame R with the complex face of the semi-finished lens, the origin of the reference frame being located at the prism reference point and its x axis being normal to the complex face at this point. The y and z axes pass through the PRP and are in the plane tangential to the complex surface at this point. The y axis passes through the PRP and through the point which is the orthogonal projection on the x axis of the fitting cross on the plane tangential to the complex surface at the PRP. The z axis is orthogonal to the two other axes, its direction being chosen so as to obtain a direct reference frame. FIG. 3 shows this reference frame and a section through the complex face in the plane (PRP, x, y).

Figure 4:
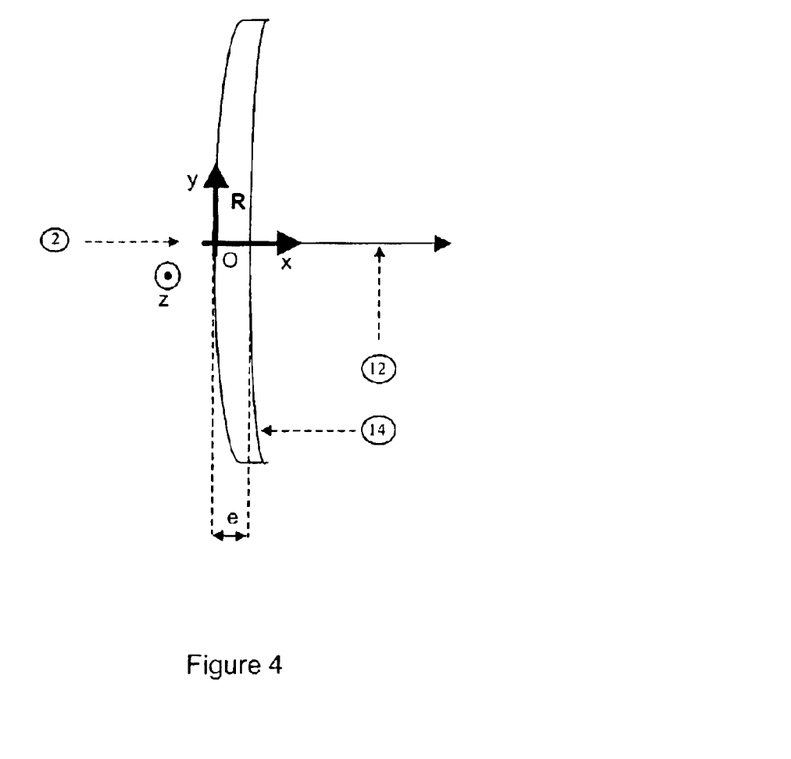

The second step in the calculation, shown in FIG. 4, consists in positioning the center of the starting prescriptions surface 14 on the x axis, at a distance from the PRP equal to the desired thickness e of the lens. This step requires knowledge of a starting prescription surface and a lens thickness. An approximation of the prescription surface can for example be obtained by subtracting from the power prescription for the wearer supplied by the eye specialist, mean sphere at the prescription point on the complex surface; this corresponds to a choice of a spherical prescription surface. If the wearer's prescription includes cylinder, with a given axis, a starting prescription surface can be chosen which has:

sphere equal to the difference between the prescription of sphere supplied by the eye specialist to which half of the prescribed cylinder has been added, and mean sphere at the prescription point of the complex surface; and a cylinder and an axis equal to the cylinder and axis prescribed by the eye specialist.

Lens thickness can be chosen as a function of the power prescribed for the wearer or, alternatively, as a function of constraints on mounting the lens in the frame. The thickness, as will be seen below, no longer varies in the method disclosed: it can consequently be equal to the thickness along the axis of the lens adapted.

Figure 5:
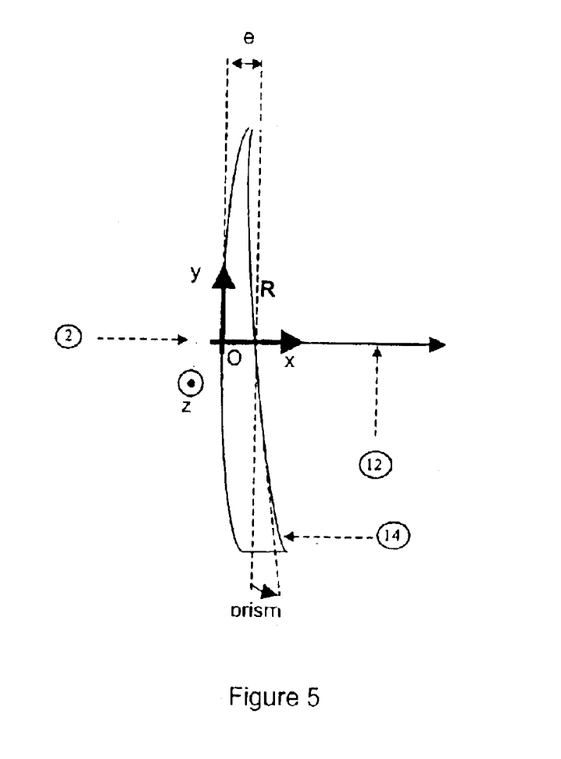

FIG. 5 shows a third step in the process. At this step, the starting surface prescription is rotated to obtain the desired prism, while keeping thickness at the center fixed. In the example illustrated, this involves a rotation about the z axis, in the direct sense. More generally, the inclination is supplied by the prism prescribed by the specialist for the wearer; the inclination of the prescription surface is consequently chosen so that the angle of the tangential plane at the x axis gives the prescribed prism. It will now be understood why the prism reference point for the complex surface bears this name.

Figure 6:
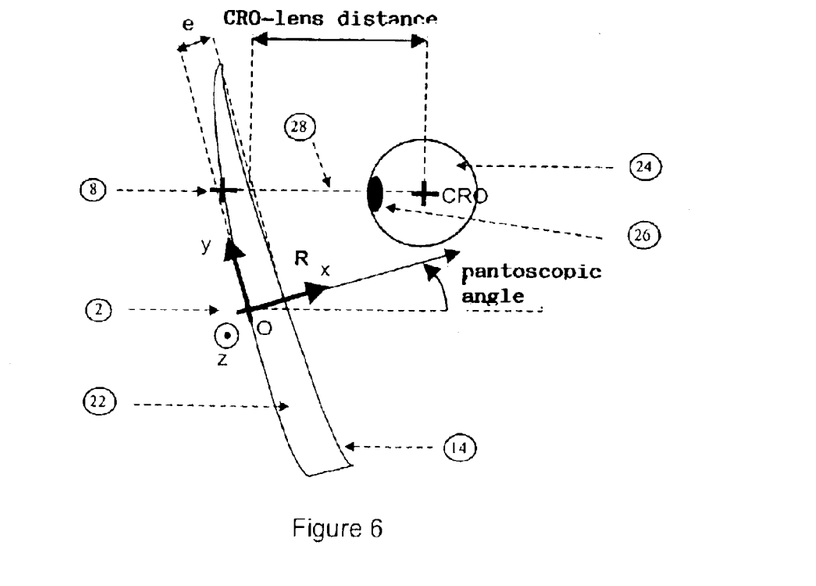

FIG. 6 shows the fourth step in the process, consisting in positioning the lens made up by the complex front face and the starting prescription face (with a thickness e and the prescribed prism) in the prescription configuration which we call the wearer configuration.

In this configuration, the initial lens needs to be positioned in front of the eye of the wearer for which the lens is designed. Other configurations will be described below.

In FIG. 6 there can be seen the initial lens 22, the wearer's eye 24, a schematic representation of the pupil 26, the center of rotation of the eye marked CRO, and the horizontal axis 28 passing through the center of rotation of the eye.

This initial lens is placed in front of the eye so as to adopt the position it would have if it had actually been mounted in the wearer's spectacle frame. This is achieved by moving it along the y axis so that the fitting cross faces the center of rotation CRO, then turning it about the axis passing through the fitting cross in the z direction through an angle equal to the pantoscopic angle of the spectacle frame. One could do the same thing along the y axis to take account of some possible bowing of the spectacle frame. Finally, the lens is moved along axis 28 so that the distance between center of rotation CRO and the prescription face is equal to the distance that would exist between the center of rotation of the eye of the wearer and the finish lens once mounted in its frame and placed in front of the eye.

These lens mounting parameters are either supplied by the producer or estimated, for the average wearer in a given population, as is known to the person skilled in the art.

Figure 7:
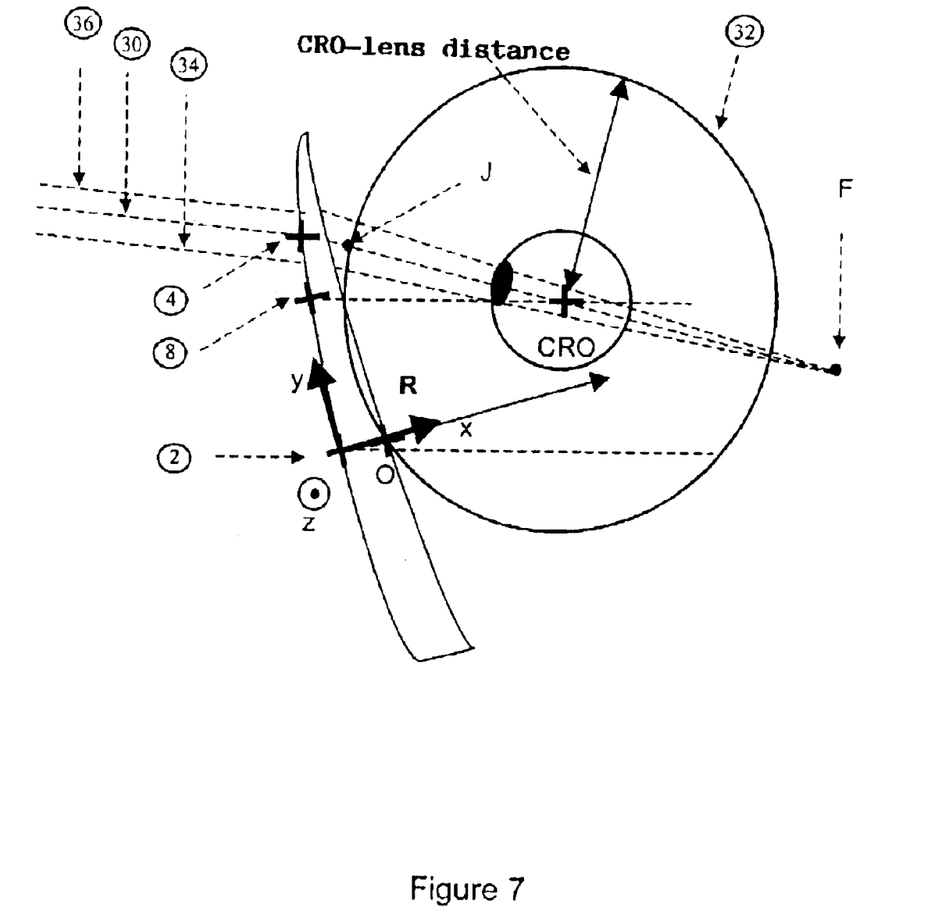

FIG. 7 shows a fifth step in the process. In this step, ray tracing, passing through the prescription point of the complex surface is used to calculate wearer power or powers obtained with the prescription surface considered. This calculation enables it to be determined whether the prescription surface considered does or does not provide the prescribed powers. It is then possible to modify, if necessary, the prescription surface as indicated below. Ray tracing can be done fairly simply: from the representation in the model: indeed, the complex surface and notably the local characteristics of the prescription surface at the prescription point or around the latter are known. At this step, ray tracing also supposes the refractive index of the material forming the lens to be known. Knowledge of the geometric characteristics of the prescription surface and a position of the prescription surface, allows ray tracing through the lens to be pursued.

In the configuration of FIG. 7, the focal points F1 and F2 of a plurality of rays parallel to ray 30, and close to the latter, can be calculated. FIG. 7 shows, by way of example, two rays 34 and 36.

Wearer powers calculated during this fifth step—but this hold for the other configurations—are equal to the inverse of a focal length. These lengths require a reference to be defined. In the wearer configuration, this reference is the sphere known as the sphere of vertices indicated by reference numeral 32 in FIG. 7. Its center is the center of rotation of the eye CRO and it passes through the point of intersection of the horizontal axis 28 and the rear surface of the lens. Thus, the proximity of one of the focal points is defined as the inverse, 1/JF of the distance JF between point J where ray 30 intersects the sphere of vertices, and the focal point F for the rays 30 and the neighboring rays considered. In this configuration, power is defined as the proximity 1/JF. The same reasoning in a perpendicular plane enables us to find the other focal point and to defined two focal points for astigmatism and their orientation as described in "Ray tracing through progressive ophthalmic lenses" by B. Bourdoncle, J. P. Chauveau and J. L. Mercier in SPIE vol. 1354 International Lens Design Conference (1990). One could also consider proximity relative to the center of rotation of the eye instead of relative to the point J.

In wavefront terms, it is also perfectly possible to calculate, for a plane incident wave front—i.e. for parallel rays—the shape of the wavefront after it has passed through the lens. After passing through the lens, the wavefront will then exhibit the values of curvature—mainly curvatures and angles, or sphere, cylinder and axis which should enable the values prescribed by the specialist to be attained.

Ray tracing for rays passing through points close to the prescription point does not require a knowledge of all of the complex surface: a knowledge of the local characteristics of the surface at the prescription point—in the case of a single ray—or around it—in the case of a plurality of rays around a ray passing through the point of prescription—is sufficient. Calculation of power is thus possible without possessing information concerning the complete complex surface.

The rear surface is calculated in this step by a method of optimization or seeking a zero value for a function; the nature of the optimization or function zero seeking is not detailed, as it is possible to employ various solutions known to those skilled in the art such as the Levenberg-Marquardt method and quasi-Newton method for optimization, or the Newton and Newton-Raphson methods for seeking the zero of a function. In principal, optimization consists in setting target values—the prescription values supplied by the specialist—and varying curvatures and prescriptions surfaces so that the values obtained during ray tracing approach the target value. One can also consider that the power values obtained by ray tracing are a real value function of variables which are curvatures of the prescription surface; in this case, seeking a prescription surface amounts to seeking values of curvature for which the values of the function are the values prescribed by the specialist. The mathematical problem is that of seeking the zeros of a real value function of several real variables. This problem can be resolved by applying known mathematical methods.

For example, the use of a Newton method for providing a wearer prescription to an accuracy of 0.001 diopters for the powers requires 2 to 4 iterations for a range of prescription spheres ranging from −2 to +2 diopters and a range of prescription cylinder from −2 to +2 diopters.

At the end of this fifth step, the invention supplies all information necessary to produce the prescription surface: thickness at the lens center is set at the second step, inclination of the prescription surface is set at the third step, positioning of a lens in front of the eye is supplied at the fourth step, and the curvatures of the prescription surface are calculated at the fifth step. Work on finishing of the prescription surface can now proceed. As explained above, this calculation of the rear surface has been done without any knowledge of the whole complex surface, but from local geometric characteristics of the complex surface, at the prescription point or around this point.

Another possible configuration for calculating power is that using a focimeter; this configuration corresponds to evaluating power under measurement conditions using a focimeter. A focimeter is a piece of apparatus well known per se; the apparatus has a nosepiece on which the lens is arranged for measurement. The apparatus supplies indications as regards power, astigmatism and axis.

Figure 8:
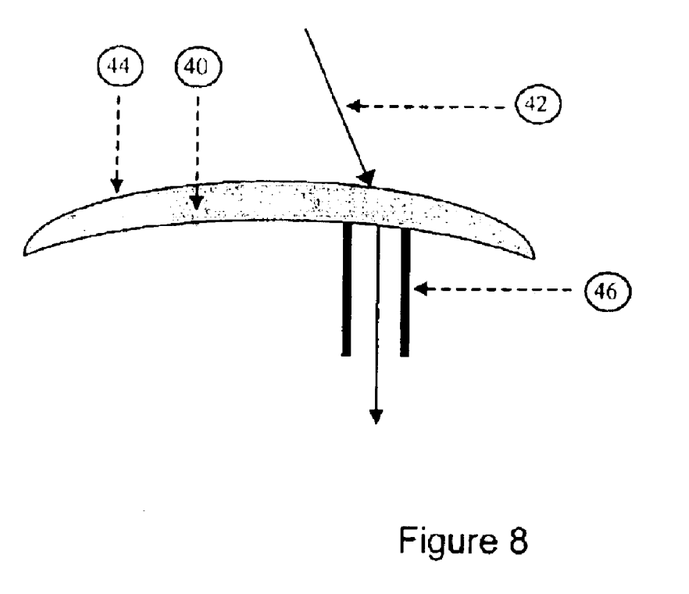
FIGS. 8 and 9 are diagrammatic views of a lens and the nosepiece of a focimeter, for various configurations of power measurement.
Figure 9:
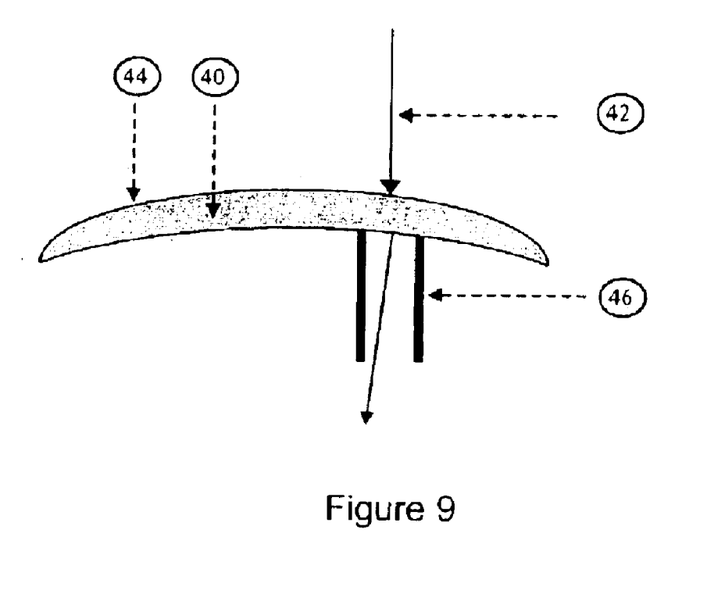

FIGS. 8 and 9 are diagrammatic views of a lens and the nosepiece of a focimeter, for power measurement under various focimeter configurations. FIG. 8 shows the lens 40, a ray 42 entering by the point to be measured at the front surface 44 of the lens, the nosepiece 46 of the focimeter, as well as the ray after passage through the lens. In a configuration of FIG. 8, traditionally called the FOA (focus on axis), the mean ray for the beam leaving the nosepiece is perpendicular to the surface in contact with the nosepiece—in the example, the rear surface. FIG. 9 is similar to FIG. 8; however, in the configuration of FIG. 9, traditionally called IOA (infinity on axis), the mean ray 42 enters the surface of the lens opposite the nosepiece parallel to the axis of the nosepiece, i.e. perpendicular to the surface in contact with the nosepiece. Other beams are not shown in FIGS. 8 and 9, nor is the focal point.

The invention can be used for determining a prescription surface of a lens, so that the results of power measurement, in one of the mentioned configurations, are equal to the specialist's prescriptions.

As a first approximation, power represents a closeness of the focal point, after passing through the lens, for a beam of rays from infinity; this definition of power has the advantage of corresponding to the definition of power for a thin lens approximation at the optical center. But considering that the rays concerned may pass through the glass with an oblique angle of incidence in the region of the lens with no axis of symmetry where local prism is nonzero and consequently in the presence of optical aberrations, one can be led to consider different configurations to achieve, exactly, the prescribed power.

In practice, opticians frequently employ a focimeter for power measurement. The prescription surface can be determined so that a measurement with the focimeter supplies the power values specified by the specialist.

It is nevertheless more advantageous for the values prescribed by the specialist to be the values obtained in the configuration of FIG. 7: indeed, this corresponds better to the spectacle wearer's perception. In this case, the values measured using a focimeter can be slightly different from the values specified by the specialist. Ray tracing nevertheless allows, once the prescription surface has been determined, to calculate what will be the results obtained by focimeter measurement for such a surface. Supplying these values to the optician will allow him to check, by measurement with the focimeter, the finishing of the prescription surface of the lens.

Obviously, this invention is not limited to the embodiments described by way of example. In the above description, we have considered the case of lenses having a complex front surface and a rear prescription surface; in other words, when spectacles are worn, the prescription surface is that surface closest to the wearer's eye. The invention also applies to the case of a prescription surface on the front of the lens, and which is not described in detail in the examples.

The model according to the invention is a set of parameters; providing values for each of these parameters provides a representation or definition of a lens surface, which is sufficient for most practical purposes. Notably, providing values for each parameter in the model makes it possible to compute the prescription surface of a semi-finished lens. The invention avoids having to provide a full representation of the lens surface (e.g. a full surface defined by a great number of altitudes at various points of the surface).

Reference frames other than those discussed in the preferred embodiments, or configurations different from those of FIGS. 7–9 for power measurement, can be used.

What is claimed is:

1. A model for representing a complex surface of an ophthalmic lens, the model comprising:
   a prism reference point and a prescription point on the complex surface of the lens;
   a normal vector to the complex surface at the prism reference point, and local characteristics of the complex surface at or around the prescription point,
wherein the local characteristics are characteristics of the complex surface within a circular patch centered on the prescription point and having a diameter less than or equal to 12 mm, and wherein the model is insufficient to entirely characterize the complex surface.

2. The model of claim 1, wherein the local characteristics comprise characteristics of the complex surface within a circular patch centered on the prescription point and having diameter greater than or equal to 2 mm.

3. The model of claim 1, wherein the prism reference point is outside of said patch.

4. The model of claim 1, wherein the local characteristics comprise normal and main curvatures with their orientations at the prescription point within a given reference frame.

5. A model for representing a lens having a first surface and a second spherical or toric surface, the model comprising
   a surface model representing the first surface of the lens, the surface model comprising:
      a prism reference point and a prescription point on the first surface of the lens;
      a normal vector to the first surface at the prism reference point, and
      local characteristics of the first surface at or around the prescription point;
   a thickness of the lens measured along an axis defined by the normal vector to the first surface at the prism reference point;
   a plane tangential to the second surface of the lens on the axis; and
   the main curvatures of the second and their orientations, on the axis,
wherein the local characteristics are characteristics of the first surface within a circular patch centered on the prescription point and having a diameter less than or equal to 12 mm, and wherein the model is insufficient to entirely characterize the first surface.

6. The model of claim 5, wherein the local characteristics comprise characteristics of the first surface within a circular patch centered on the prescription point and having diameter greater than or equal to 2 mm.

7. The model of claim 5 wherein the prism reference point is outside of said patch.

8. The model of claim 5, wherein the local characteristics comprise normal and main curvatures with their orientations at the prescription point within a given reference frame.

9. A method for calculating the prescription surface of a semi-finished lens having a first surface, comprising:
   providing a prescription comprising at least a power and a prism;
   providing a representation of the first surface in a model having
      a prism reference point and a prescription point on the first surface;
      a normal vector to the first surface at the prism reference point, and
      local characteristics of the first surface at or around the prescription point;
   calculating a spherical or toric prescription surface using ray tracing passing through the prescription point or around the prescription point of the first surface;
wherein the local characteristics are characteristics of the first surface within a circular patch centered on the prescription point and having a diameter less than or equal to 12 mm, and wherein the model is insufficient to entirely characterize the first surface.

10. The process of claim 9, wherein the step of calculating comprises:
   choosing a lens thickness;
   providing a starting prescription surface having, on an axis defined by the normal to the complex surface at the prism reference point, the prism of said prescription;
   varying curvatures and their orientation for the starting prescription surface, without varying the prism on said axis, so that at least one power calculated by said ray tracing approaches said at least a power of said prescription.

11. The process of claim 9, wherein, in the model, the local characteristics comprise characteristics of the first surface within a circular patch centered on the prescription point and having diameter greater than or equal to 2 mm.

12. The process of claim 9, wherein, in the model, the prism reference point is outside of said patch.

13. The process of claim 9, wherein, in the model, the local characteristics comprise normal and main curvatures with their orientations at the prescription point within a given reference frame.

* * * * *

UNITED STATES PATENT AND TRADEMARK OFFICE
CERTIFICATE OF CORRECTION

PATENT NO. : 6,789,898 B2
DATED : September 14, 2004
INVENTOR(S) : Gilles Le Saux and Pascal Allione It is certified that error appears in the above-identified patent and that said Letters Patent is hereby corrected as shown below:

Column 12,
Line 18, after "surface" delete ";" and insert -- , --

Signed and Sealed this

Fifth Day of July, 2005

JON W. DUDAS
*Director of the United States Patent and Trademark Office*